Aug. 26, 1958     A. W. G. ERVINE ET AL     2,848,855
ARTICLE ARRANGING DEVICE

Filed Jan. 25, 1954     7 Sheets-Sheet 1

Fig. 1

INVENTORS
ALBERT W. G. ERVINE
WARREN S. REYNOLDS
BY
John H. Lewis Jr.
ATTORNEYS

Aug. 26, 1958   A. W. G. ERVINE ET AL   2,848,855
ARTICLE ARRANGING DEVICE
Filed Jan. 25, 1954   7 Sheets-Sheet 4

INVENTORS
ALBERT W. G. ERVINE
WARREN S. REYNOLDS
BY
ATTORNEYS

INVENTORS
ALBERT W. G. ERVINE
WARREN S. REYNOLDS
BY
ATTORNEYS

Aug. 26, 1958 A. W. G. ERVINE ET AL 2,848,855
ARTICLE ARRANGING DEVICE
Filed Jan. 25, 1954 7 Sheets-Sheet 6

INVENTORS
ALBERT W.G. ERVINE
WARREN S. REYNOLDS
BY
John H. Lewis Jr.
ATTORNEYS

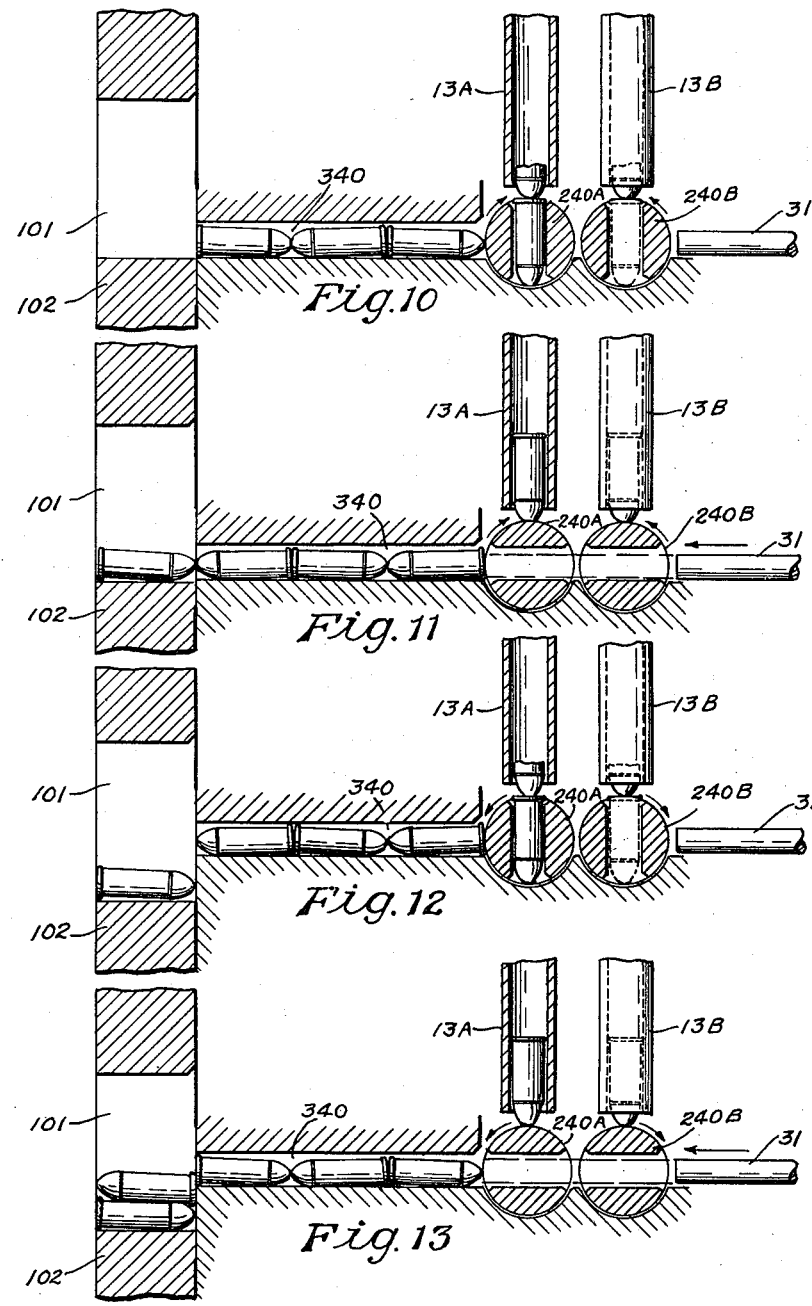

United States Patent Office 2,848,855
Patented Aug. 26, 1958

2,848,855

ARTICLE ARRANGING DEVICE

Albert W. G. Ervine, Bridgeport, and Warren S. Reynolds, Westport, Conn., assignors to Remington Arms Company, Inc., Bridgeport, Conn., a corporation of Delaware Application January 25, 1954, Serial No. 405,843

4 Claims. (Cl. 53—143)

This invention relates to means for packaging elongated longitudinally asymmetric articles, such as cartridges, in a flat package in which a plurality of columns of articles of similar orientation are interspersed with other columns of articles in reverse orientation, so that transversely of the package the articles of any one row are in head-and-tail sequence.

Generally stated, the invention contemplates transferring cartridges from a conventional shaker plate or other support in which they are uniformly oriented, usually in staggered rows, forming the cartridges into columns of uniform orientation, reversing the orientation of certain columns with respect to the orientation of other columns, and transferring a set of the columns thus oriented into a flat container in which the articles in any one column are in the same orientation while the articles in any transverse row are in head-and-tail sequence.

In the drawings:

Fig. 1 is a sectional side elevation substantially on the line 1—1 of Fig. 3, the cartridge orienting blocks being in cartridge receiving position.

Figs. 10 to 13, inclusive, are somewhat diagrammatic sectional elevations of a modified form of orienting blocks adapted for use in the arranging of a rectangular set of longitudinal asymmetric articles in side-by-side relation and head-and-tail sequence in two directions.

Figure 5:
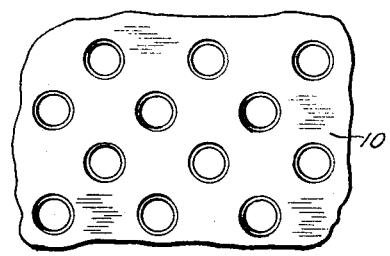
Fig. 5 is a fragmentary plan view of a shaker plate.

The machine, in the specific embodiment to be described, is designed to receive cartridges from a holder 10 (Figs. 1 and 5) which may be a conventional shaker plate in which the cartridges are suspended in bullet-down position. The holder may comprise means for retaining cartridges thus arranged therein but, for simplicity of illustration, this means has been omitted, and the cartridges may be considered as supported upon a top plate 11 and free to drop from the holder when such support is discontinued. For the purpose of illustration, holder 10 has been shown as comprising five double rows of forty-nine cartridges each, the cartridges in each line of each double row being staggered with respect to the cartridges in the other line of such double row. These details, however, are not material, and it will be obvious that the holder construction may vary widely.

The present machine, in one of the forms to be described, contemplates filling seven packages at one time, each package comprising four rows of seven cartridges in side-by-side relation and in head-and-tail sequence. It will be sufficient for the purpose of this description to consider the filling of one package only.

Means (not shown) are provided for moving the holder 10 continuously across the top plate 11, as indicated by the arrow, Fig. 1. Plate 11 comprises two rows of apertures 12A and 12B in a spacing corresponding to the spacing of the lines of cartridges in the holder. Communicating with each aperture is a tube 13A and 13B, into which tubes the cartridges in each holder line drop as they come opposite the apertures 12A and 12B. Tubes 13A and 13B are supported at the top in upper support plate 14 and at the bottom in a lower support plate 15, which plate is apertured in line with tubes 13A and 13B.

Figure 4:
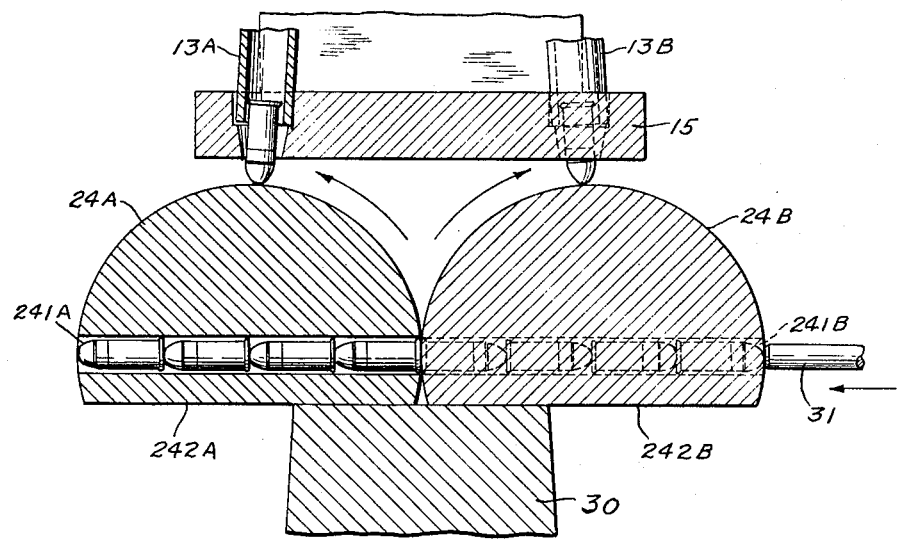
Fig. 4 is a fragmentary longitudinal sectional elevation, the section being substantially on the same line as Fig. 1, and the orienting blocks being in cartridge delivering position.

The machine is supported on a suitable base or frame which may comprise side plates 16 and 17, end plates 18 and 19 and upright plates 20 and 21, the latter supporting the head structure comprising the aforementioned plates 11 and 14. Journaled in suitable recesses in side plates 16 and 17 are spindles or stub shafts 22, 23, which are integral with orienting blocks 24A and 24B associated respectively with the delivery tubes 13A and 13B. Each orienting block is substantially semi-cylindrical in shape, the external semi-cylindrical surface of each constituting a temporary support for cartridges in the associated delivery tube, as shown in Fig. 4. Each block comprises a set of any desired number (seven, for example) of diametric apertures 241A and 241B, and when the orienting blocks are in cartridge-receiving position, as shown in Fig. 1, alternate apertures in each block are aligned respectively with tubes 13A and 13B. As illustrated, there are four tubes 13A and three tubes 13B, but it will be understood that when the machine is transversely extended to simultaneously fill a plurality of receptacles, as above described, the adjacent set of B tubes will be four in number and the adjacent set of A tubes will be three in number; thus providing for the removal of all cartridges in the holder 10.

Rigidly secured to each orienting block is a gear 25A and 25B, which gears intermesh to provide for reverse intermittent rotation of the orienting blocks. Such rotation may be supplied by any suitable means, one form of which will be hereinafter described. As shown in Fig. 1, certain apertures 241A and 241B are aligned with the associated delivery tubes, so that cartridges released from the holder 10 drop through the tubes and into the orienting block apertures, coming to rest against arcuate-faced stops 27A and 27B, which stops are preferably pivoted between the side plates 16 and 17 at 28A and 28B, being held in effective position by removable pins 29A and 29B projecting through apertures in the side plates and into the stops. By withdrawing the pins and permitting the stops to swing about their pivots, any foreign matter can be removed from both the orienting block apertures and the associated delivery tubes.

Figure 2:
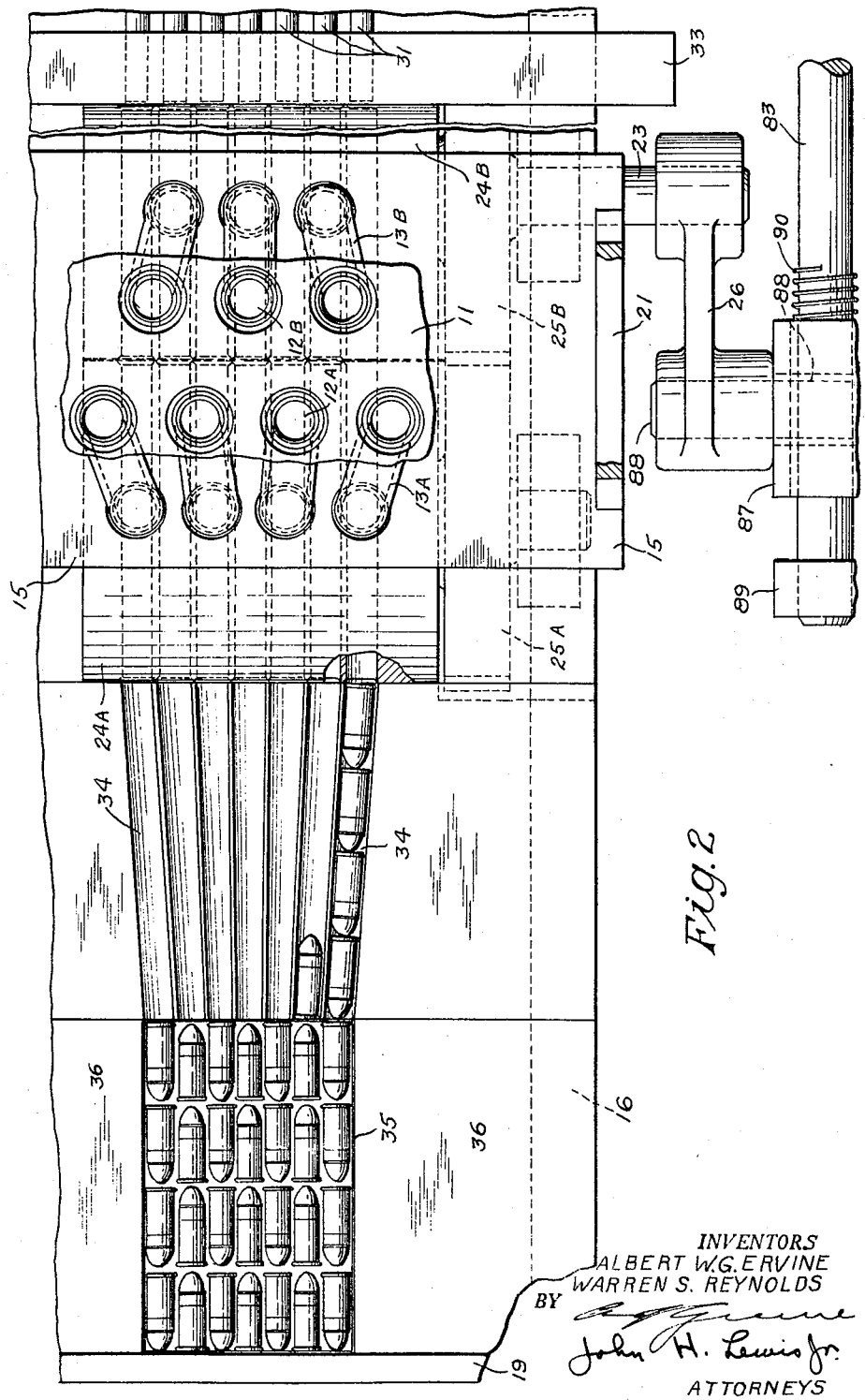
Fig. 2 is a plan view, partly in section, the section being substantially on the line 2—2 of Fig. 1.
Figure 3:
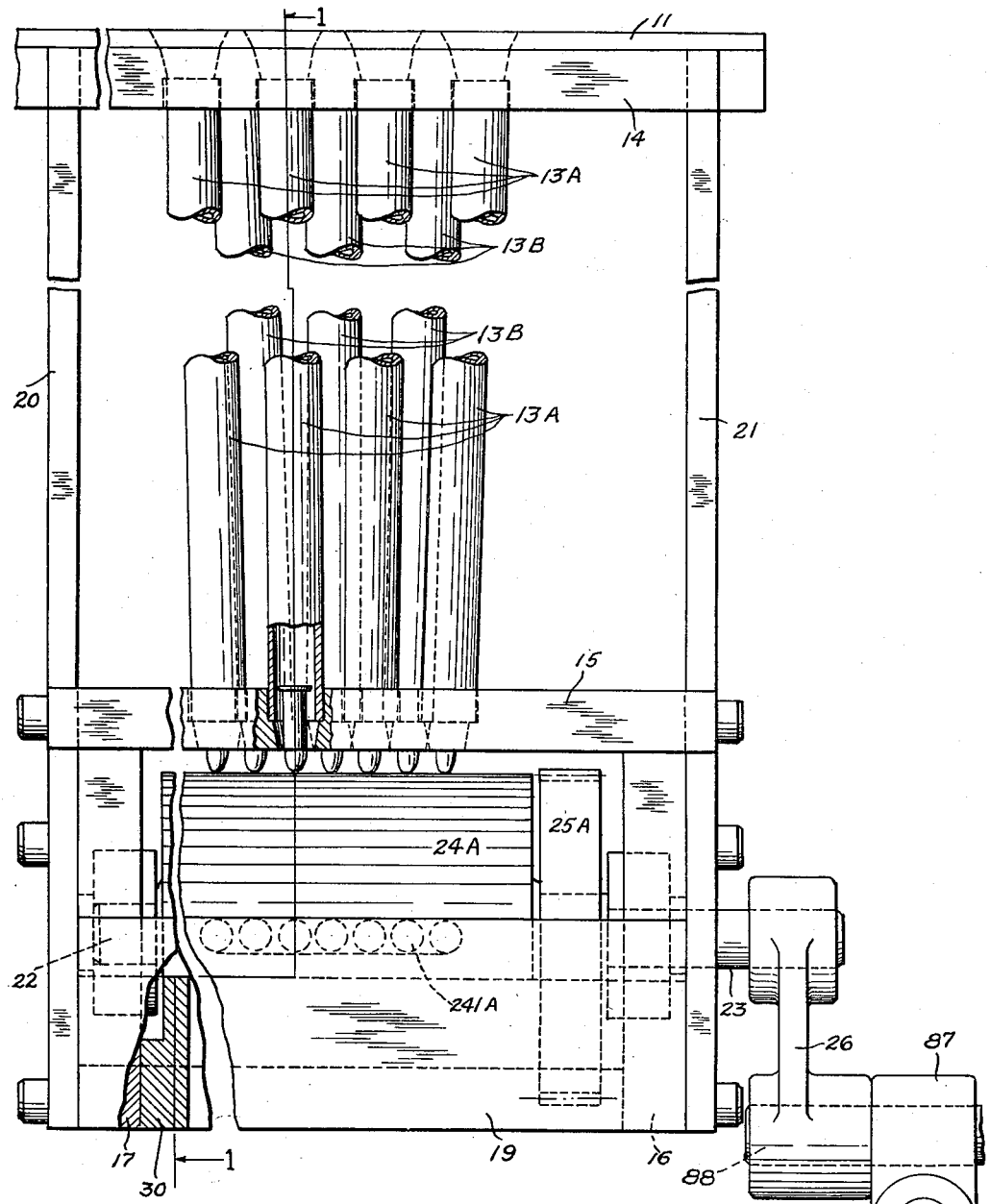
Fig. 3 is a fragmentary end elevation, certain parts being broken away, for greater clearness.

The length of each aperture 241A and 241B is a multiple of the length of the articles to be packaged. As shown, each aperture is adapted to contain four cartridges and support a fifth cartridge with its bullet nose substantially in line with the cylindrical periphery of the orienting block, so that upon rotation of the orienting blocks (Fig. 4) a group of four cartridges is segregated in each loaded aperture and other cartridges in the delivery tubes are supported upon the cylindrical surfaces of the orienting blocks. Each orienting block is stopped with its apertures in cartridge-receiving position by the engagement of the flat faces 242A and 242B thereof with a stop block 30 secured between said plates 16 and 17. Rotation of the orienting blocks in the direction of the arrows, Fig. 1, through about 90° brings other portions of said flat faces of the orienting block into contact with the top of stop block 30, the apertures in the orienting blocks being in horizontal position and the cartridges in the blocks respectively being reversely oriented due to the reverse rotation of the blocks, as shown in Fig. 4. With the blocks in this position, the cartridges are removed therefrom by a set of push rods 31 carried by a crosshead 32 and passing through openings in a guide block 33, the push rods being in alignment with the orienting block apertures when the latter are in cartridge delivering position. Crosshead 32 may be manually actuated or may be operated in timed relation to the rotation of the orienting blocks by any suitable mechanical means, a representative form of which will be presently described. It will be obvious that in the first part of the advancing (leftward, Fig. 4) movement of push rods 31 alternate rods engage the columns of cartridges in alternate apertures 241B in block 24B and push such cartridges ahead of them into the empty apertures in block 24A, while the intermediate push rods advance idly through the intermediate apertures. As the rods further advance, traversing the apertures 241A in block 24A, the idle rods pick up the cartridges in apertures 241A, and the complete set of seven columns of cartridges is ejected from said block and is received in a set of troughs 34 positioned with their end portions substantially in line with the apertures in block 24A when in cartridge-delivering position. As shown in Fig. 2, troughs 34 converge as they recede from the orienting block, so that the cartridges therein come to be aligned in side-by-side relation, with a very small intermediate spacing.

A set of twenty-eight cartridges having been thus delivered into the trough 34, the set of push rods 31 is retracted, and the orienting blocks are restored to Fig. 1 position, to receive a second set of cartridges from the delivery tubes 13A and 13B, after which the orienting blocks are again rotated to Fig. 4 position and the push rods again advanced to eject cartridges from the orienting blocks. The troughs 34 being full, the forward movement of the second set advances the set already in the troughs into a container 35 supported in a guideway 36 in alignment with the set of troughs. A cover member 37 (Fig. 1) above the troughs prevents upward displacement of any cartridges during this movement. The container has a length equal to the length of four cartridges, so that it is adapted to receive as a unit a complete set of seven columns of four cartridges each from the troughs 34 while a second set of such cartridges is being thrust endwise through the troughs. The use of suitable container handling devices is contemplated, but such devices are not illustrated since they form no part of the present invention.

Figure 6:
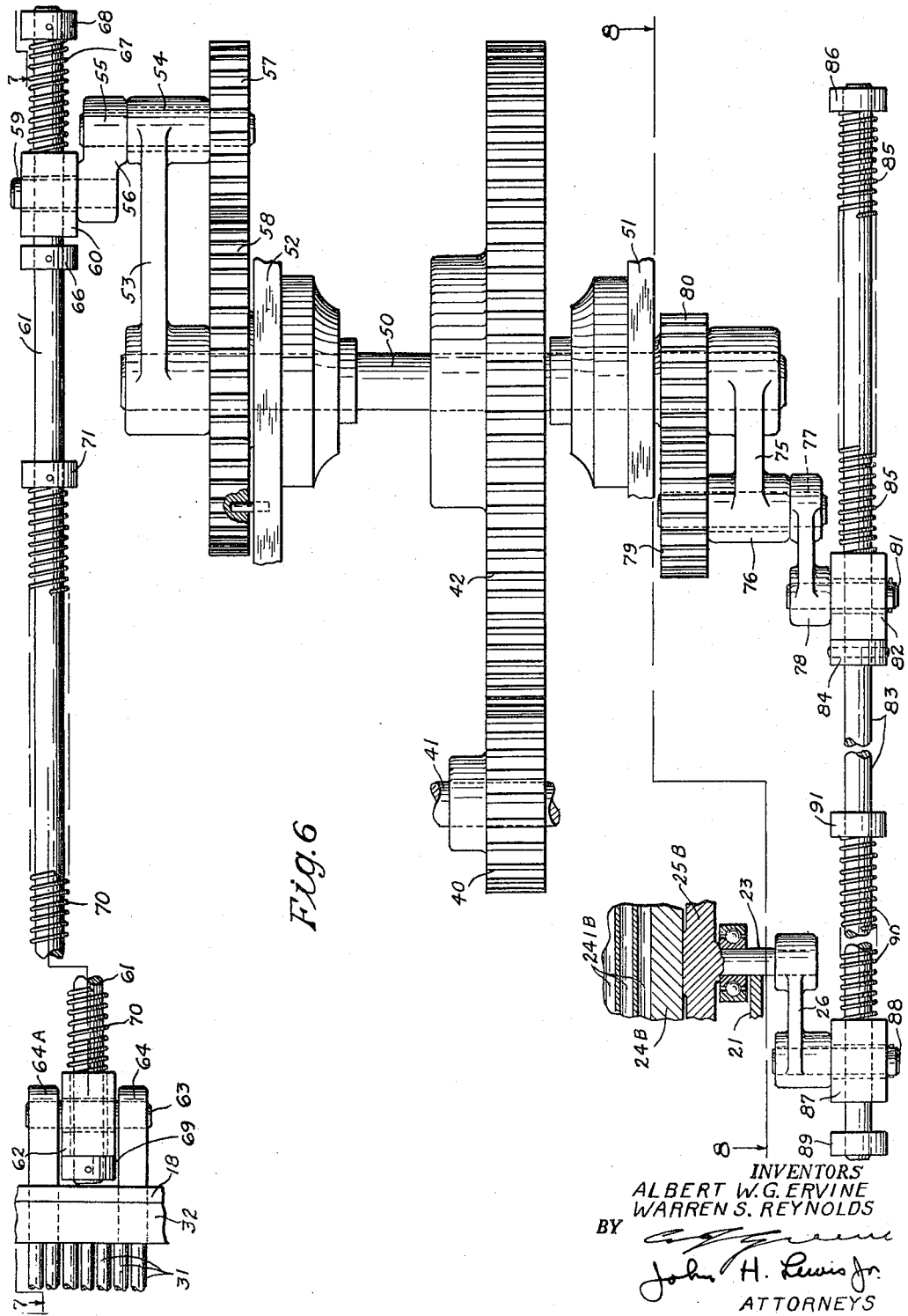
Fig. 6 is a skeleton plan view of one form of drive mechanism for pushers and orienting blocks.
Figure 7:
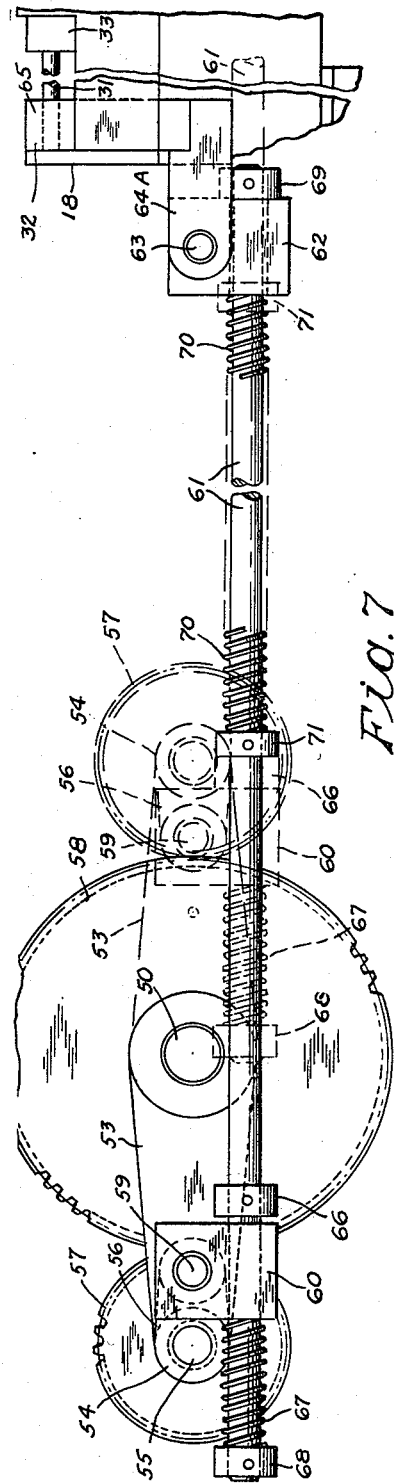
Fig. 7 is a detached side elevation of the drive for the pushers.
Figure 8:
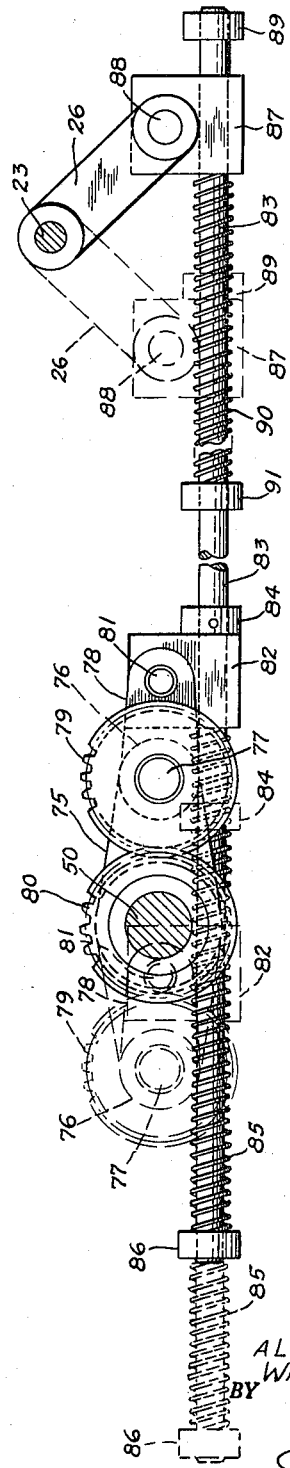
Fig. 8 is a detached side elevation of the drive for the orienting blocks.

Figs. 6 to 8, inclusive, illustrate one form of drive mechanism for pushers and orienting blocks. It will be remembered that the orienting blocks are stationary throughout the entire cycle of movement of the pushers, and that the pushers remain stationary in retracted position clear of the orienting blocks while the orienting blocks are rotated from delivery position to receiving position and back to delivery position. The mechanism illustrated comprises a pinion 40 secured to a shaft 41 driven by a suitable means, not shown. Pinion 40 meshes with gear 42 secured to a shaft 50. Shafts 41 and 50 are supported in fixed plates 51—52 beneath the supporting frame above-described.

Figure 9:
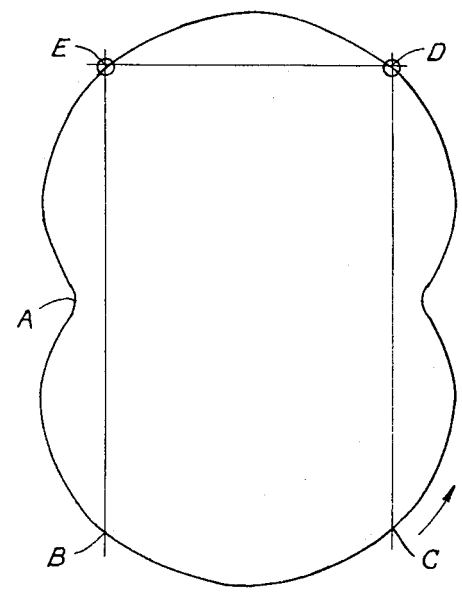
Fig. 9 is a diagram of the path of movement of the epicyclic crank pin in the drive train for the pushers.

The drive for the pushers comprises a crank 53 secured to shaft 50 and provided with a boss 54 apertured to receive a stub shaft 55 having secured thereto an epicyclic crank 56 and an epicyclic gear 57 meshing with a control gear 58 secured to the frame plate 52. Gear 58 is twice the diameter of gear 57. A crank pin 59 projects from the free end of chank 56, and the path of movement of said crank pin 59 is shown in Fig. 9. Said crank pin 59 is received in an aperture in a connector 60, which connector is likewise apertured to loosely receive a connecting rod 61 which is also loosely held in an aperture in a connector 62 pivotally supported on a pin 63 held between arms 64 and 64A of a connecting block 65 secured to crosshead 32, which crosshead, it will be remembered, carries the pushers 31. The movement of connecting rod 61 by and relative to connector 60 is determined and controlled by an abutment 66 secured to the connecting rod and a spring 67 encircling the connecting rod and compressed between connector 60 and a head 68 likewise secured to the connecting rod. The movement of connector 62 by connecting rod 61 and movement of said connecting rod relative to said connector 62 is controlled by and permitted by a head 69 secured to the connecting rod and a spring 70 encircling the connecting rod and compressed between connector 62 and an abutment 71 likewise secured to the connecting rod.

The outward or retracted position of the pushers is determined by the engagement of crosshead 32 with frame plate 18, this position being shown in full lines in Fig. 7. The connecting rod is urged leftward by spring 70 until head 69 engages the face of connector 62. The crank pin 59 is in th cusp A of the diagram (Fig. 9) and the connector 60 is thus held in a position slightly removed from the abutment 66, compressing spring 67 which also urges the connecting rod to the left.

The condition of the drive mechanism when the pushers are fully advanced is shown in broken lines in Fig. 7. Crosshead 32 has engaged the abutment 33, stopping the movement of connector 62. This occurs at about position C (Fig. 9) in the movement of the epicyclic crank pin 59. As the crank pin continues to move from position C to position D, the connecting rod moves with it due to the engagement of connector 60 with abutment 66, compressing the spring 70. After the crank pin reaches position D, the pushers are retracted, while the crank pin moves from position D to position E, at which point crosshead 32 engages frame plate 18 and, head 69 being in engagement with connector 62, further leftward movement of connecting rod 61 is stopped. The connecting rod remains in this position until crank pin 59 reaches the point B; thus, a relatively long dwell is provided at each end of the pusher movement. During the time represented by the curve between the points E and B, the pushers stand retracted and the orienters are moved from delivery position to receiving position and back to delivery position. During the time represented by the curve between the points C and D, the pushers are held in advance position, holding the cartridges in the troughs 34 and the container in guideway 35 against retrograde movement, while the filled container is withdrawn, and replaced by an empty one.

The means illustrated for operating the orienting blocks comprises a crank 75 secured to drive shaft 50 and terminating in a boss 76 apertured to receive a stud shaft 77 having secured thereto an epicyclic crank 78 and an epicyclic gear 79 which meshes with a control gear 80 concentric with shaft 50 and secured to frame plate 51. The epicyclic crank 78 is provided with a crank pin 81 received in a transverse aperture in a connector 82 which comprises a longitudinal aperture adapted to receive a connecting rod 83. The relative motion between connector 82 and connecting rod 83 is determined by an abutment 84 secured to the connecting rod and a spring 85 compressed between connector 82 and a head 86 on the connecting rod. The opposite end of the connecting rod is received in an aperture in a connector 87 which is transversely apertured to receive a crank pin 88 projecting from the aforementioned crank 26, joined to orienting block 24B. Relative motion between connecting rod 83 and connector 87 is controlled by a connecting rod head 89 and a spring 90 compressed against a connecting rod abutment 91. It will be remembered that the rotation of the orienting blocks is limited by their engagement with the face of stop block 30. The springs and abutments associated with connecting rod 83 enable the orienting blocks to be so controlled, notwithstanding the more complex movement of the epicyclic crank pin 81. Fixed gear 80 and epicyclic gear 79 are in a 1-to-1 ratio, the envelope of the path of movement of the epicyclic crank pin approximating the desired timing of the movement and dwell of the orienting blocks.

Figs. 10 to 13, inclusive, illustrate somewhat diagrammatically a modification of the orienting blocks adapted to deliver a plurality of columns of cartridges, the cartridges in each column being in alternating head-and-tail sequence, rather than uniformly oriented as above-described. This is desirable for arranging a rectangular set of cartridges in side-by-side relation and in alternating head-and-tail sequence. The orienting blocks 240A and 240B, which receive cartridges from delivery tubes 13A and 13B identical with those above described, are of the depth of one cartridge, instead of the depth of a plurality of cartridges. The orienting blocks being loaded, as shown in Fig. 10, they are rotated 90° to delivery position, as shown in Fig. 11, and the pushers 31 are advanced, to empty the orienting blocks, and then retired in the manner above described. Thereafter, however, the orienting blocks, instead of being returned to their initial position, are rotated in the same direction through another 90°, again aligning their cartridge receiving apertures with the delivery tubes, but in inverted position (Fig. 12). In this position, each orienting block aperture receives a cartridge from the associated delivery tube, and thereafter the orienting blocks are reversely rotated to the Fig. 13 position. It will be seen that the rotation of the orienting blocks, which displaces them from the Fig. 12 position to Fig. 13 position, is the reverse of that which displaces them from the Fig. 10 position to the Fig. 11 position; thus reversing the orientation of each cartridge removed with respect to the cartridge which preceded it—the head-and-tail sequence illustrated in these figures is thus established. As before, cartridges pushed out of the orienting blocks are received in converging passages 340, which passages communicate with cartridge receiving cells 101 in an indexible holder 102. Means are provided for indexing the holder between each operation of the pushers by an amount equal to the greatest diameter of the cartridges, so that each succeeding operation of the pushers delivers a layer of cartridges to the cells on top of one or more layers already therein. The filling of the cells layer-by-layer is indicated in Fig. 13. The subsequent transfer of the set of cartridges from the filled cells to a portable container is contemplated, but the means for this purpose is not part of the present invention.

In the foregoing specification and in the claims which follow, the term "row" indicates an arrangement of elongated articles in side-by-side relation, and the term "column" indicates an arrangement of elongated articles in end-to-end relation.

What is claimed is:

1. Apparatus for arranging longitudinally asymmetric articles in a row in which adjacent articles are reversely oriented, comprising a pair of orienting blocks on parallel axes, common drive means for rotating said blocks in opposite directions, each of said blocks having a plurality of article passages extending transversely therethrough, respective passages of said blocks being in longitudinal registry in a rotative article delivering position of said blocks, means for placing articles to be arranged in alternate passages in each of said blocks at one position of rotation of said blocks whereby an empty passage in each block is opposite and in alignment with an article containing passage in the other block when said blocks are rotated to said article delivery position, a set of article receiving elements disposed to register with said passages in article delivery position, and means for ejecting the articles contained in the passages of the two said blocks to said article receiving elements.

2. Apparatus according to claim 1, in which said article ejecting means comprises a set of rods associated respectively with the passages in said orienting blocks and adapted to enter and pass through said passages.

3. Apparatus according to claim 2, in which the passages in said orienting blocks are vertically disposed when in article receiving position and are horizontally disposed when in article delivering position.

4. Apparatus according to claim 3, comprising stop means for stopping the movement of said orienting blocks toward article receiving position and article delivering position respectively.

References Cited in the file of this patent

UNITED STATES PATENTS

| | | |
|---|---|---|
| 1,412,227 | Anderson et al. | Apr. 11, 1922 |
| 2,069,926 | Read | Feb. 9, 1937 |
| 2,555,861 | Reynolds | June 5, 1951 |